July 3, 1923.                    1,460,625
J. R. VILLARD
AUTOMOBILE SIGNAL
Filed Aug. 28, 1922          2 Sheets-Sheet 1

INVENTOR
Joseph R. Villard
BY
Frank Keiper
ATTORNEY

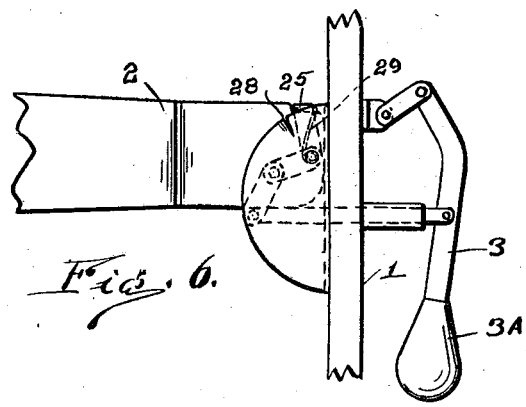
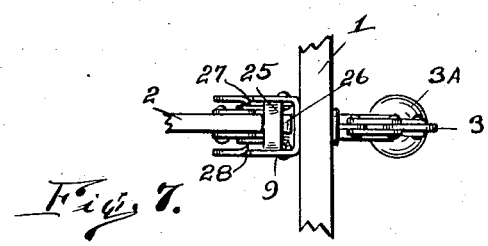
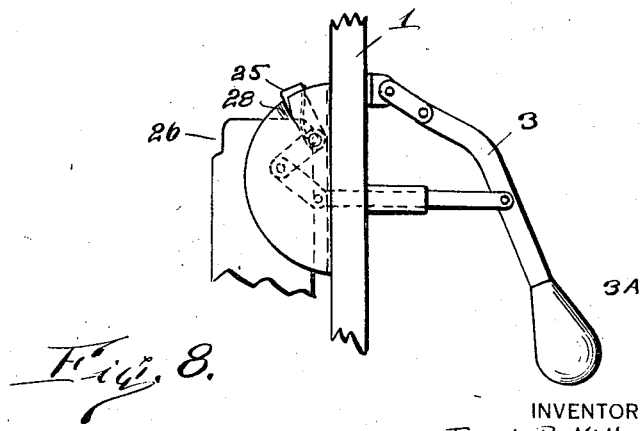

Patented July 3, 1923.

1,460,625

UNITED STATES PATENT OFFICE.

JOSEPH R. VILLARD, OF ROCHESTER, NEW YORK.

AUTOMOBILE SIGNAL.

Application filed August 28, 1922. Serial No. 584,629.

*To all whom it may concern:*

Be it known that I, JOSEPH R. VILLARD, a citizen of the United States, residing at Rochester, in the county of Monroe and State of New York, have invented certain new and useful Improvements in Automobile Signals, of which the following is a specification.

The object of this invention is to provide an improved type of auto signal which is especially adapted for use on trucks and other commercial vehicles.

This and other objects of this invention will be fully illustrated in the drawing, described in the specification and pointed out in the claims at the end thereof.

Figure 1:
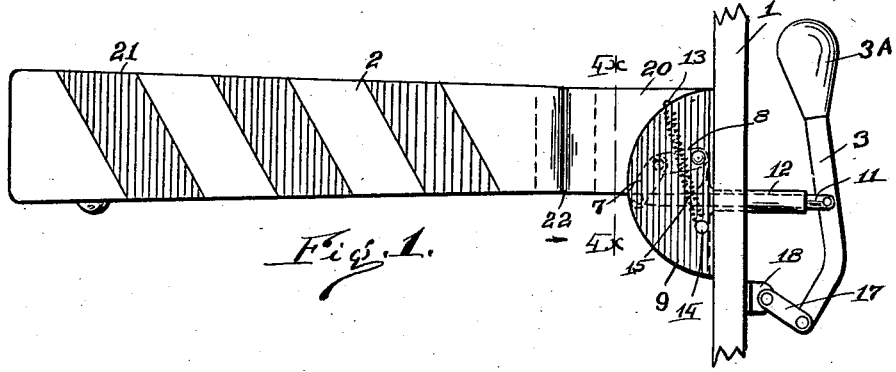
Figure 1 is a side elevation of the signal in its operative position.
Figure 2:
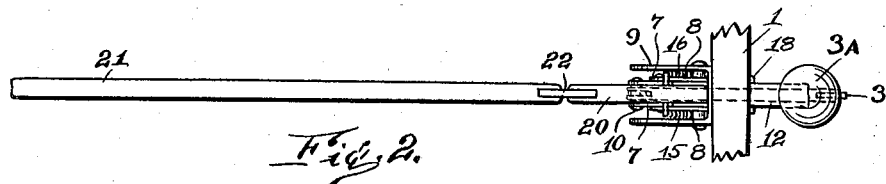
Figure 2 is a top plan view of the signal.
Figure 4:
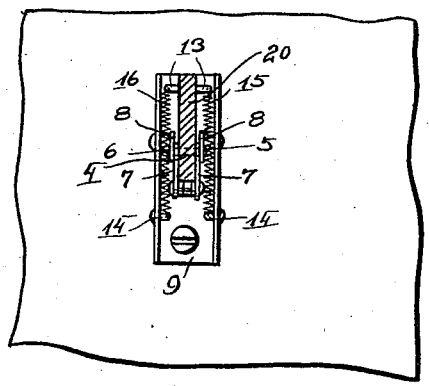
Figure 4 is a transverse sectional view of the signal, the section being taken on the line $4^x$—$4^x$ of Figure 1.
Figure 3:
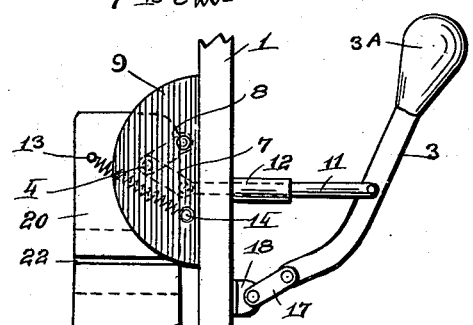
Figure 3 is a side elevation of the signal in its inoperative position.
Figure 5:
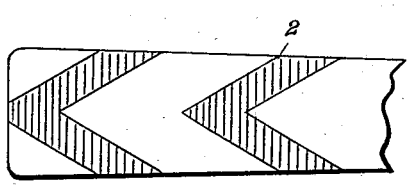
Figure 5 is a side elevation of the signal arm showing a modified form of marking on this arm to make it readily discernible from a distance.

Figures 6 to 8 inclusive are views of the signal similar to the views of the signal shown in Figures 1 to 3 inclusive, showing a modified locking means for holding the signal arm in the horizontal or operative position.

In the several figures of the drawing like reference numerals indicate like parts.

Automobile signals of the type illustrated in the accompanying drawing on which my present invention is an improvement both in the construction and the operation thereof, are used to indicate that the car showing the signal is about to turn, slow down, or stop. For this purpose the signal is attached to the side of the body of the car at a convenient point where it is within easy reach of the driver who operates it.

As illustrated in Figures 1 to 3 inclusive the car body to which the signal is attached is indicated at 1 with the signal arm 2 mounted on the outside and the operating lever 3 mounted on the inside of the car body close to the driver's seat. The signal arm 2 is pivoted on the stud 4 mounted between the toggle levers 5 and 6 each of which is made up of the links 7 and 8. These toggle levers are located on each side of the signal arm and the upper links 8 of each of these levers are pivoted to the inside of the sides of the semi-circular casing 9. The lower links 7 of the toggle levers are connected together by a pivot pin 10. To this pivot pin 10 is also connected the outer end of the push rod 11 which is mounted to slide in a suitable bearing sleeve 12 mounted in the car body.

Stretched between each side of the signal arm 2 and the inside of each of the sides of the casing 9, between suitable studs 13 and 14 respectively, are the expansion springs 15 and 16. These springs operate to assist in moving the signal arm into either the operative or inoperative position and holding it in these positions as will hereinafter be described.

The inner end of the push rod 11 is pivoted to the operating lever 3 near the middle thereof. The operating lever in turn is pivoted on the outer end of the short link 17 mounted to swing on the lug 18. This pivotal connection of the operating lever 3 on the inside of the car body 1 permits its movement from the position illustrated in Figure 1 to that illustrated in Figure 3 or vice versa, a handle $3^A$ being provided at the top of the lever 3 to facilitate the easy operation thereof.

In moving the operating lever from the one to the other position illustrated in the figures of the drawing, the push rod 11 is moved in and out of the bearing sleeve 12 mounted in the car body. This movement of the push rod operates the toggle levers 5 and 6 and swings them from the position illustrated in Figure 1 to that shown in Figure 3 or vice versa. As the toggle levers 5 and 6 are located on each side of the signal arm straddling a portion thereof the pivot pin 10 connecting the lower links 7 of these toggle levers rests against the right hand side of the signal arm when in the inoperative position illustrated in Figure 3 or against the bottom of the signal arm when in the operative position illustrated in Figure 1. When, therefore, the lever 3 is forced to the left from the position illustrated in Figure 3, the pivot pin 10 is forced against the side of the signal arm causing it to rotate on its pivot stud 4. This rotation of the signal arm is continuous until the arm has described an arc of 90° or has moved from the position illustrated in Figure 3 to that shown in Figure 1. When moved into the operative position the push rod 11 is located directly below the arm and provides a support for the arm to rest thereon.

To hold the signal arm in the operative as well as the inoperative position, the springs 15 and 16 are provided. These springs are stretched between the signal arm and casing 9 as above pointed out and the point of attachment of the spring on the arm is such that the springs tend to rotate the arm on is pivot so as to force it tightly against the top of the push rod 11 as illustrated in Figure 1 or against the side of the car body as illustrated in Figure 3.

A rubber bumper 19 is fastened to the signal arm 2 near the outer end thereof so that the arm is cushioned when striking the side of the car body during its movement from the operative to the inoperative position.

As the signal arm when operated projects out and away from the car body it is possible that in passing an object the arm may strike it and either do some damage or get broken itself. To avoid this the signal arm is made up of the two sections 20 and 21. Of these sections the section 20 forms the signal arm proper while the section 21 comprises a short member operated by the signaling mechanism with which the signal arm is held in position. These two sections are connected together by a flexible connecting plate 22. This plate is suitably embedded in the ends of the sections 20 and 21 of the signal arm and when an obstruction is encountered by the outer end of the signal arm it allows the section 21 to swerve to one side to pass the obstruction. After the obstruction has been passed the connecting plate 22 straightens out and moves the section 21 back into alignment with the section 20 to form one continuous signal arm.

The connecting plate 22 may be made of any suitable material having the necessary qualities to perform the function above described, rubberized belting material having been found suitable for the purpose.

In Figures 6 to 8 inclusive the signal is illustrated provided with a locking latch 25 in place of the springs 15 and 16. This latch is made up in the form of a yoke and is pivoted between the sides of the casing 9 on the inside thereof. The rear end of the signal arm is slightly notched out at 26 so that the top of the yoke 25 can engage it and hold it locked in the horizontal position illustrated in Figure 6.

When the signal arm is released and moved to the vertical position illustrated in Figure 8 in the manner above described in connection with Figures 1 to 3 inclusive, the rear end of the arm disengages itself automatically from the yoke and the yoke swings slightly forward until a further movement is arrested by the stops 27 and 28 struck up in the sides of the casing 9. A spring 29 is provided to force the yoke forwardly in engagement with the signal arm and prevent its disengagement therefrom except by operating the mechanism above described.

I claim:

1. In an automobile signal, the combination of a base, a pair of toggle levers mounted to swing on said base, a signal arm pivoted between said toggle levers and intermediate thereof, a push rod pivoted to the free end of said toggle levers and making contact with the inner or under edge of said signal arm, said push rod being adapted to be moved to swing said toggle levers with said signal arm on said base until said push rod slides under the end of said signal arm and allows said signal arm to rest on top of said push rod which then forms a supporting bracket for said signal arm to hold it in a horizontal position.

2. In an automobile signal, the combination of a base, a pair of toggle levers mounted to swing on said base, a signal arm pivoted between said toggle levers and intermediate thereof, a push rod pivoted to the free end of said toggle levers and making contact with the inner or under edge of said signal arm, said push rod being adapted to be moved to swing said toggle levers with said signal arm on said base until said push rod slides under the end of said signal arm and allows said signal arm to rest on top of said push rod which then forms a supporting bracket for said signal arm to hold it in a horizontal position, said arm being adapted to be withdrawn from under the end of said signal arm and allow said signal arm to swing down between said toggle levers and independently thereof.

3. In an automobile signal, the combination of a base, a pair of toggle levers mounted to swing on said base, a signal arm pivoted between said toggle levers and intermediate thereof, a push rod pivoted to the free end of said toggle levers and making contact with the inner or under edge of said signal arm, said push rod being adapted to be moved to swing said toggle levers with said signal arm on said base until said push rod slides under the end of said signal arm and allows said signal arm to rest on top of said push rod which then forms a supporting bracket for said signal arm to hold it in a horizontal position, said arm being adapted to be withdrawn from under the end of said signal arm and allow said signal arm to swing down between said toggle levers and independently thereof, means for automatically locking said signal arm in its horizontal position said locking means being automatically released on the movement of said push rod to allow said signal arm to drop into the vertical position.

4. In an automobile signal, the combination of a base, a pair of toggle levers mounted to swing on said base, a signal arm pivoted between said toggle levers and intermediate thereof, a push rod pivoted to the free end of said toggle levers and making contact with the inner or under edge of said signal arm, said push rod being adapted to be moved to swing said toggle levers with said signal arm on said base until said push rod slides under the end of said signal arm and allows said signal arm to rest on top of said push rod which then forms a supporting bracket for said signal arm to hold it in a horizontal position, said arm being adapted to be withdrawn from under the end of said signal arm and allow said signal arm to swing down between said toggle levers and independently thereof, a yoke pivoted on said base with said toggle levers, said yoke being adapted to engage the upper edge of said signal arm when in the horizontal position and hold said signal arm temporarily locked in this position.

In testimony whereof I affix my signature
JOSEPH R. VILLARD.